(12) United States Patent
Tian et al.

(10) Patent No.: US 12,307,766 B2
(45) Date of Patent: May 20, 2025

(54) WEB-END VIDEO PLAYING METHOD AND APPARATUS, AND COMPUTER DEVICE

(71) Applicant: SHANGHAI BILIBILI TECHNOLOGY CO., LTD., Shanghai (CN)

(72) Inventors: Qiuran Tian, Shanghai (CN); Zhaoxin Tan, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 32 days.

(21) Appl. No.: 18/078,811

(22) Filed: Dec. 9, 2022

(65) Prior Publication Data
US 2023/0106217 A1 Apr. 6, 2023

Related U.S. Application Data

(63) Continuation of application No. PCT/CN2020/140995, filed on Dec. 29, 2020.

(30) Foreign Application Priority Data

Jun. 11, 2020 (CN) .......................... 202010529065.0

(51) Int. Cl.
G06V 20/40 (2022.01)
H04N 21/4402 (2011.01)
(52) U.S. Cl.
CPC ..... *G06V 20/40* (2022.01); *H04N 21/440218* (2013.01)
(58) Field of Classification Search
CPC ........... G06V 20/40; H04N 21/440218; H04N 21/64322; H04N 21/8456; H04N 21/85406; H04N 21/858
See application file for complete search history.

(56) References Cited

U.S. PATENT DOCUMENTS 10,356,404 B1 7/2019 Khsib
10,404,662 B1 9/2019 Ben-Dor et al.
(Continued)

FOREIGN PATENT DOCUMENTS

CN 102215429 A 10/2011
CN 103051941 A 4/2013
(Continued)

OTHER PUBLICATIONS

International Patent Application No. PCT/CN2020/140995; Int'l Written Opinion and Search Report; dated Mar. 18, 2021; 6 pages.

*Primary Examiner* — Suraj M Joshi
*Assistant Examiner* — Jaren Means
(74) *Attorney, Agent, or Firm* — BakerHostetler

(57) ABSTRACT

This application discloses a Web-end video playback method and apparatus, and a computer device. The method includes: obtaining to-be-played FLV-format video data; decapsulating the FLV-format video data by using a preset WebAssembly bytecode to obtain effective video data, and storing the effective video data into a preset doubly linked list; encapsulating the effective video data in the doubly linked list using the WebAssembly bytecode to obtain FMP4-format video data; and loading, through media source extensions, the FMP4-format video data to a Web-end video player for playback. This application further provides a computer-readable storage medium. In this application, different video data is decapsulated and encapsulated using the WebAssembly bytecode, and then new-format video data is loaded through media source extensions. This reduces occupation of processing resources in a Web-end video data processing process and improves processing efficiency.

19 Claims, 4 Drawing Sheets

(56) References Cited

U.S. PATENT DOCUMENTS

| | | | | |
|---|---|---|---|---|
| 10,477,333 | B1* | 11/2019 | Pogue | H04R 3/12 |
| 2007/0097257 | A1* | 5/2007 | El-Maleh | H04N 19/124 |
| | | | | 375/E7.184 |
| 2011/0173345 | A1* | 7/2011 | Knox | H04N 21/2343 |
| | | | | 709/246 |
| 2018/0131741 | A1* | 5/2018 | Song | H04N 21/23439 |
| 2018/0324231 | A1* | 11/2018 | Akhtar | H04L 65/80 |
| 2019/0215542 | A1 | 7/2019 | Gandhi et al. | |

FOREIGN PATENT DOCUMENTS

| | | |
|---|---|---|
| CN | 103517135 A | 1/2014 |
| CN | 105280205 A | 1/2016 |
| CN | 108718416 A | 10/2018 |
| CN | 109088887 A | 12/2018 |
| CN | 109195012 A | 1/2019 |
| CN | 109905763 A | 6/2019 |
| CN | 110545461 A | 12/2019 |
| CN | 110620959 A | 12/2019 |
| CN | 110662116 A | 1/2020 |
| CN | 110858915 A | 3/2020 |
| CN | 111083569 A | 4/2020 |

* cited by examiner

WEB-END VIDEO PLAYING METHOD AND APPARATUS, AND COMPUTER DEVICE

CROSS-REFERENCE TO RELATED APPLICATIONS

This application is a continuation of PCT/CN2020/140995, filed on Dec. 29, 2020, which claims priority to Chinese Patent Application No. 202010529065.0, entitled "WEB-END VIDEO PLAYBACK METHOD AND APPARATUS, AND COMPUTER DEVICE", filed on Jun. 11, 2020, the disclosures of which are incorporated herein by reference in their entireties.

BACKGROUND

With the development of computer technologies, video playback applications have rapidly developed. When video data is played at the Web end, improved video playback techniques are desirable.

SUMMARY

This application provides a Web-end video playback method and apparatus, and a computer device, to resolve a problem in a conventional technology that many processing resources are occupied and processing efficiency is low when video data in different formats is decapsulated, encapsulated, and played at a Web end.

First, to implement the foregoing objective, this application provides a Web-end video playback method, where the method includes:

obtaining to-be-played FLV-format video data; decapsulating the FLV-format video data by using a preset WebAssembly bytecode, to obtain effective video data, and storing the effective video data into a preset doubly linked list; encapsulating the effective video data in the doubly linked list by using the WebAssembly bytecode, to obtain FMP4-format video data; and loading, through media source extensions, the FMP4-format video data to a Web-end video player for playback.

In an example, the WebAssembly bytecode is generated by compiling C language code by using an Emscripten tool, and the C language code includes instruction code used to decapsulate the FLV-format video data and encapsulate an effective video data into the FMP4-format video data at a Web end.

In an example, the decapsulating the FLV-format video data by using a preset WebAssembly bytecode, to obtain effective video data includes: identifying, based on an FLV format, an FLV tag in a data encapsulation packet corresponding to the FLV-format video data; and extracting the effective video data corresponding to the FLV-format video data from the FLV tag.

In an example, the encapsulating the effective video data in the doubly linked list by using the WebAssembly bytecode, to obtain FMP4-format video data includes: finding the effective video data by using a head node pointer and a tail node pointer of each data node in the doubly linked list; and encapsulating, based on an FMP4 format, the effective video data into an MP4Box corresponding to the FMP4-format video data.

In an example, the encapsulating, based on an FMP4 format, the effective video data into an MP4Box corresponding to the FMP4-format video data includes: splitting and encapsulating the effective video data into a plurality of boxes based on a preset box size in the FMP4 format; and arranging all the boxes based on a sequence, and splicing all the boxes based on the arrangement sequence, to form the MP4Box corresponding to the FMP4-format video data.

In an example, after the finding the effective video data by using a head node pointer and a tail node pointer of each data node in the doubly linked list, the method includes: obtaining each audio frame of audio data in the effective video data and a corresponding timestamp, where the timestamp is a reference timestamp for synchronously playing audio data and image data in video data; dividing the audio data into a plurality of audio data segments based on a preset time interval; collecting statistics about a quantity n of audio frames in a first audio data segment in the plurality of audio data segments and a timestamp difference L between the first audio frame and the last audio frame, where the first audio data segment is any audio data segment of the plurality of audio data segments; inserting a blank audio frame into the first audio data segment based on L, n, and a preset blank audio frame insertion rule, to obtain a second audio data segment; and replacing the first audio data segment in the audio data with the second audio data segment.

In an example, the blank audio frame insertion rule includes: when L is less than a preset threshold M, skipping inserting a blank audio frame into the first audio data segment; or when L is greater than or equal to M, inserting $[(L-n*x)/x]$ blank audio frames into the first audio data segment, where x is an audio inter-frame spacing, and $M>(n+1)*x$.

In addition, to implement the foregoing objective, this application further provides a Web-end video playback apparatus, where the apparatus includes:

an obtaining module, configured to obtain to-be-played FLV-format video data; a decapsulation module, configured to: decapsulate the FLV-format video data by using a preset WebAssembly bytecode, to obtain effective video data, and store the effective video data into a preset doubly linked list; an encapsulation module, configured to encapsulate the effective video data in the doubly linked list by using the WebAssembly bytecode, to obtain FMP4-format video data; and a playback module, configured to load, through media source extensions, the FMP4-format video data to a Web-end video player for playback.

Further, this application further provides a computer device, where the computer device includes a memory and a processor, computer readable instructions that can be run on the processor are stored in the memory, and the computer readable instructions are executed by the processor to implement the following steps:

obtaining to-be-played FLV-format video data; decapsulating the FLV-format video data by using a preset WebAssembly bytecode, to obtain effective video data, and storing the effective video data into a preset doubly linked list; encapsulating the effective video data in the doubly linked list by using the WebAssembly bytecode, to obtain FMP4-format video data; and loading, through media source extensions, the FMP4-format video data to a Web-end video player for playback.

Further, to implement the foregoing objective, this application further provides a computer-readable storage medium, where the computer-readable storage medium stores computer readable instructions, and the computer readable instructions can be executed by at least one processor to enable the at least one processor to perform the following steps:

obtaining to-be-played FLV-format video data; decapsulating the FLV-format video data by using a preset WebAssembly bytecode, to obtain effective video data, and storing the effective video data into a preset doubly linked list; encapsulating the effective video data in the doubly linked list by using the WebAssembly bytecode, to obtain FMP4-format video data; and loading, through media source extensions, the FMP4-format video data to a Web-end video player for playback.

According to the Web-end video playback method and apparatus, the server, and the computer-readable storage medium, the to-be-played FLV-format video data can be obtained; next, the FLV-format video data can be decapsulated by using the preset WebAssembly bytecode, to obtain the effective video data, and the effective video data can be stored into the preset doubly linked list; subsequently, the effective video data in the doubly linked list can be encapsulated by using the WebAssembly bytecode, to obtain the FMP4-format video data; and the FMP4-format video data can be loaded, through media source extensions, to the Web-end video player for playback. Different video data is decapsulated and encapsulated by using the WebAssembly bytecode, and then new-format video data is loaded through media source extensions. This reduces occupation of processing resources in a Web-end video data processing process, and improves processing efficiency.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application. All other embodiments obtained by a person of ordinary skill in the art based on the embodiments of this application without creative efforts shall fall within the protection scope of this application.

It should be noted that the terms "first" and "second" in this application are merely used for description, and shall not be understood as an indication or implication of relative importance or an implicit indication of a quantity of indicated technical features. Therefore, features limited by "first" or "second" may explicitly or implicitly include at least one of the features. In addition, technical solutions in the embodiments may be combined with each other, provided that a person of ordinary skill in the art can implement the combination. When the combination of the technical solutions is contradictory or cannot be implemented, it should be considered that the combination of the technical solutions does not exist and does not fall within the protection scope of this application.

Due to a very small formed file and a very fast loading speed, video data in a Flash Video (FLV) format makes it possible to watch a video file on a network, and effectively resolves a problem that the video file cannot be well used on the network because the video file has a very large volume after the video file is imported into Flash Player. Therefore, network resources related to current video data are mostly stored in the FLV format. However, a more lightweight player in a fragmented MP4 (FMP4) format is generally used at a Web end. Therefore, when video data is played at the Web end, downloaded FLV-format video data generally needs to be first converted into FMP4-format video data.

A JavaScript scripting language can be compatible with the Web end. A plug-in having a JavaScript function is generally used at the Web end to implement the following process: decapsulating the received FLV-format video data, re-encapsulating the FLV-format video data into the FMP4-format video data, and loading the FMP4-format video data to a Web-end player for playback. However, the JavaScript scripting language consumes a relatively long time in a compilation process. As a result, a processing process of decapsulating, encapsulating, and playing the video data at the Web end by using the JavaScript scripting language occupies a relatively large quantity of processing resources at the Web end, and processing efficiency is low.

Figure 1:
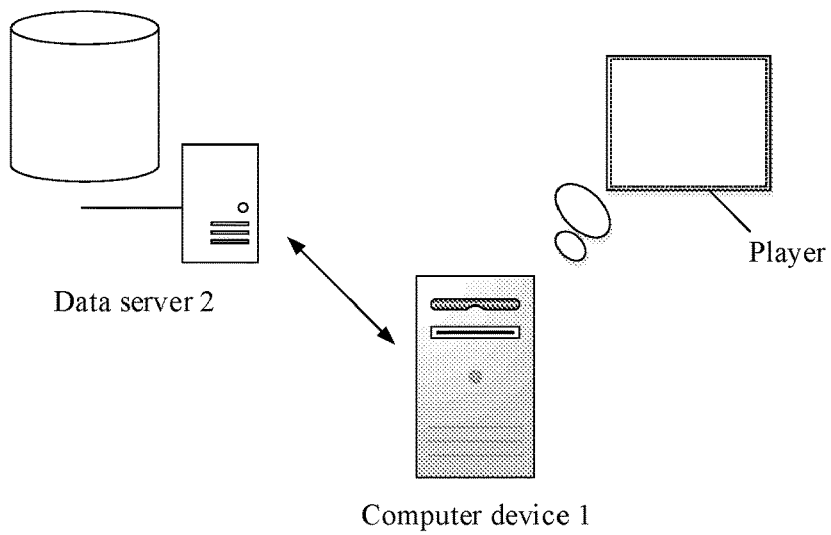
FIG. 1 is a schematic diagram of an application environment according to an embodiment of this application.

FIG. 1 is a schematic diagram of an application environment according to an embodiment of this application. Referring to FIG. 1, a computer device 1 is connected to a data server 2. When receiving a video playback request, the computer device 1 may send a video data obtaining request to the data server 2, and then receive video data sent by the data server 2. Then, the computer device 1 converts a format of the received video data, and loads the video data to a player for playback. The computer device 1 may obtain to-be-played FLV-format video data; next, decapsulate the FLV-format video data by using a preset WebAssembly bytecode, to obtain effective video data, and store the effective video data into a preset doubly linked list; subsequently, encapsulate the effective video data in the doubly linked list by using the WebAssembly bytecode, to obtain FMP4-format video data; and finally, load, through media source extensions, the FMP4-format video data to a Web-end video player for playback. In this embodiment, the computer device 1 may be a mobile phone, a tablet, a portable device, a PC, another electronic device that has a display function, or the like.

Embodiment 1

Figure 2:
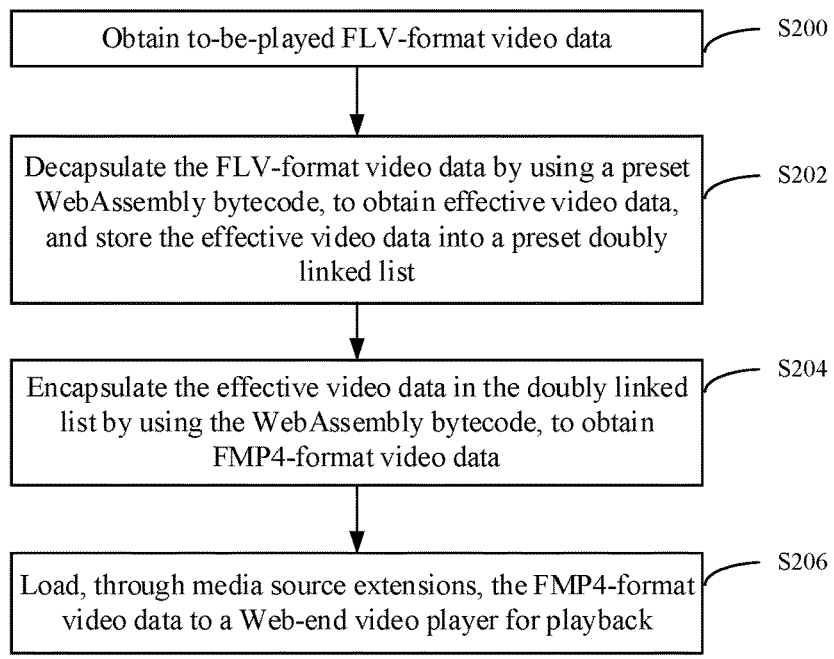
FIG. 2 is a schematic flowchart of a specific embodiment of a Web-end video playback method according to this application.

FIG. 2 is a schematic flowchart of an embodiment of a Web-end video playback method according to this application. It may be understood that the flowchart in this method embodiment is not used to limit a sequence for performing steps. The following is described by using an example in which a computer device 1 is an execution body.

As shown in FIG. 2, the Web-end video playback method may include steps S200 to S206:

Step S200. Obtain to-be-played FLV-format video data.

Step S202. Decapsulate the FLV-format video data by using a preset WebAssembly bytecode, to obtain effective video data, and store the effective video data into a preset doubly linked list.

Step S204. Encapsulate the effective video data in the doubly linked list by using the WebAssembly bytecode, to obtain FMP4-format video data.

Specifically, when a user watches a video by using a Web end on the computer device 1, the computer device 1 triggers a video data request for the to-be-watched video based on a tap operation, a touch operation, or the like of the user, and sends the video data request to a corresponding data server. For example, if the user taps an "animation AAA" by using a browser, the computer device 1 obtains a video data resource address of "animation AAA", for example, a server BBB. In this case, the computer device 1 sends a video data request for "animation AAA" to the server BBB.

Next, the computer device 1 may receive to-be-played video data fed back by the data server. In this embodiment, because network resources related to video data are mostly stored in an FLV format, the computer device 1 may receive the to-be-played FLV-format video data.

After obtaining the FLV-format video data, the computer device 1 decapsulates the FLV-format video data based on the preset WebAssembly bytecode, to obtain the effective video data. In this embodiment, the WebAssembly bytecode is generated by compiling C language code by using an Emscripten tool, and the C language code includes instruction code used to decapsulate the FLV-format video data and encapsulate the effective video data into the FMP4-format video data at the Web end. WebAssembly is a new coding manner, and may be run on a modern Web browser. In addition, WebAssembly is a low-level class assembly language, and can be used to compile a program with a compact binary format, namely, the WebAssembly bytecode. In this embodiment, the computer device 1 pre-establishes, by using the Emscripten tool, the WebAssembly bytecode based on the C language code. Because WebAssembly is a low-level class assembly language, the WebAssembly bytecode may be run with near native performance, can be run on the Web, and may coexist with a JavaScript scripting program on the Web. This allows the WebAssembly bytecode and the JavaScript scripting program to work together, and has high compatibility. In addition, because efficiency of executing the WebAssembly bytecode at the Web end is better than efficiency of executing the JavaScript scripting program, efficiency of executing a decapsulation process can be improved.

Figure 3:
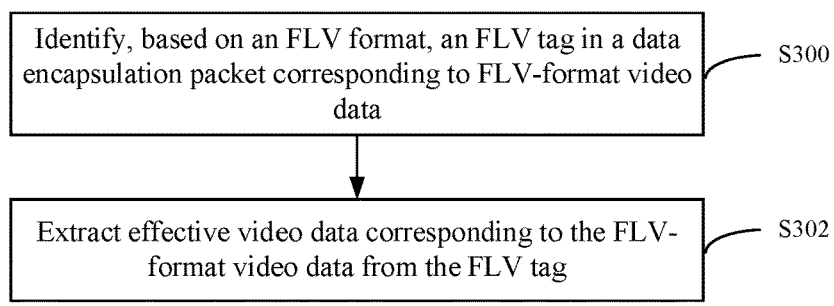
FIG. 3 is a schematic flowchart of a specific embodiment of step 202 of decapsulating the FLV-format video data by using a preset WebAssembly bytecode, to obtain effective video data in FIG. 2.

Referring to FIG. 3, in an example, step S202 of decapsulating the FLV-format video data by using a preset WebAssembly bytecode, to obtain effective video data includes the following steps:

Step S300. Identify, based on an FLV format, an FLV tag in a data encapsulation packet corresponding to the FLV-format video data.

Step S302. Extract the effective video data corresponding to the FLV-format video data from the FLV tag.

Specifically, the FLV-format video data generally includes many FLV data encapsulation packets, each FLV data encapsulation packet includes an FLV data header and an FLV data body, the FLV data body includes a plurality of FLV tags, and each FLV tag may be used to store audio data or image data. Therefore, the computer device 1 may decapsulate the FLV-format video data based on the FLV format, to extract the audio data or the image data in each FLV tag in the FLV-format video data, namely, the effective video data, and then store the effective video data into the preset doubly linked list. The effective video data is actually audio data and image data other than a packet header of the encapsulation packet and other format data that implements an encapsulation function that are in the data encapsulation packet corresponding to the FLV-format video data.

The computer device 1 completes decapsulation of the FLV-format video data by using the WebAssembly bytecode, to obtain the effective video data corresponding to the FLV-format video data. The effective video data is video data obtained after a data format is removed. Next, the computer device 1 encapsulates the effective video data by using the WebAssembly bytecode.

Figure 4:
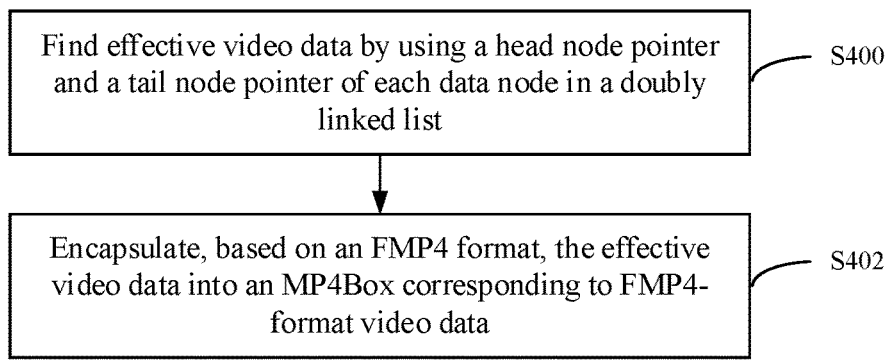
FIG. 4 is a schematic flowchart of a specific embodiment of step 204 in FIG. 2.

Referring to FIG. 4, in an example, the encapsulating the effective video data in the doubly linked list by using the WebAssembly bytecode, to obtain FMP4-format video data includes the following steps:

Step S400. Find the effective video data by using a head node pointer and a tail node pointer of each data node in the doubly linked list.

Step S402. Encapsulate, based on an FMP4 format, the effective video data into an MP4Box corresponding to the FMP4-format video data.

In this embodiment, after decapsulating the FLV-format video data by using the WebAssembly bytecode, the computer device 1 stores the obtained effective video data into the preset doubly linked list. Therefore, that the computer device 1 may find the effective video data by using the head node pointer and the tail node pointer in the doubly linked list, to perform an operation of encapsulating the effective video data into the FMP4-format data includes: encapsulating the effective video data into the MP4Box corresponding to the FMP4-format data, performing an operation of inserting a blank audio frame and an operation of deleting redundant data; and finally, obtaining the FMP4-format data corresponding to the effective video data. When decapsulating the FLV-format video data, and encapsulating the effective video data into the FMP4-format data, the computer device 1 needs to dynamically increase or decrease video frame data to adapt to the FMP4 format. In a conventional technology, intermediate data existing in a video data format conversion process is basically stored in a form of an array. Therefore, the computer device 1 uses the doubly linked list instead of the array, to prevent video data from being copied a plurality of times by dynamically increasing or decreasing the video data when the intermediate data is stored by using the array. Therefore, consumption of processing performance of the Web end can be reduced, and performance of processing video frame data at the Web end is improved.

In addition, the computer device 1 stores the effective video data by using the doubly linked list, and both the head node pointer and the tail node pointer of each data node in the doubly linked list have a positioning function. Therefore, when performing an operation such as searching, inserting, or deleting a target data node in the doubly linked list, the computer device 1 may determine whether the target data node is close to the head node pointer or the tail node pointer. Then, based on the principle of proximity, the computer device 1 starts to traverse to the target data node, to quickly perform a corresponding search, insertion, or deletion operation. In this way, decapsulation efficiency of decapsulating the FLV-format video data and encapsulation efficiency of encapsulating the effective video data are improved.

Figure 5:
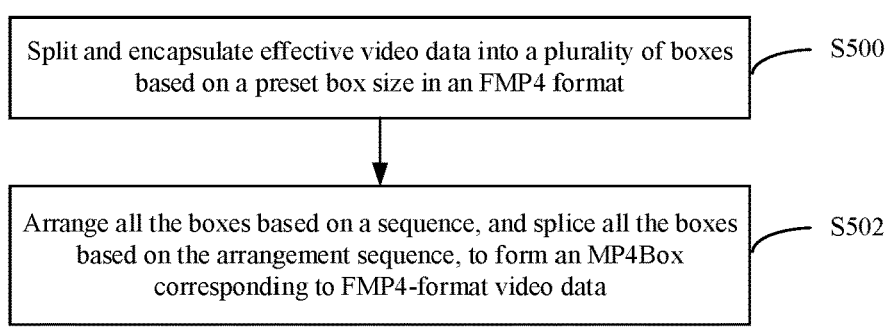
FIG. 5 is a schematic flowchart of a specific embodiment of step 402 in FIG. 4.

Referring to FIG. 5, in an example, step S402 of encapsulating, based on an FMP4 format, the effective video data into an MP4Box corresponding to the FMP4-format video data may include the following steps:

Step S500. Split and encapsulate the effective video data into a plurality of boxes based on a preset box size in the FMP4 format.

Step S402. Arrange all the boxes based on a sequence, and splice all the boxes based on the arrangement sequence, to form the MP4Box corresponding to the FMP4-format video data.

In this embodiment, when performing an encapsulation operation, the computer device 1 can adjust a step performed in the encapsulation process. Specifically, when encapsulating the effective video data, the computer device 1 splits and packages the effective video data into the plurality of boxes based on the preset box size in the FMP4 format, and then splices all the box data together after arranging all the box data based on the sequence, to obtain the MP4Box corresponding to the FMP4-format data. In the conventional technology, when the FMP4 video data is encapsulated, each time a box is generated, the box data is spliced with previous box data. Although a function of a distributed operation can be implemented, redundant box bytes need to be copied in a plurality of times of repeated splicing, and a large quantity of processing resources are consumed for a lightweight Web end. Therefore, a change is made herein, that is, the MP4Box is obtained by generating a plurality of boxes and finally splicing the boxes together, so that encapsulation efficiency of the FMP4-format video data is improved.

Figure 6:
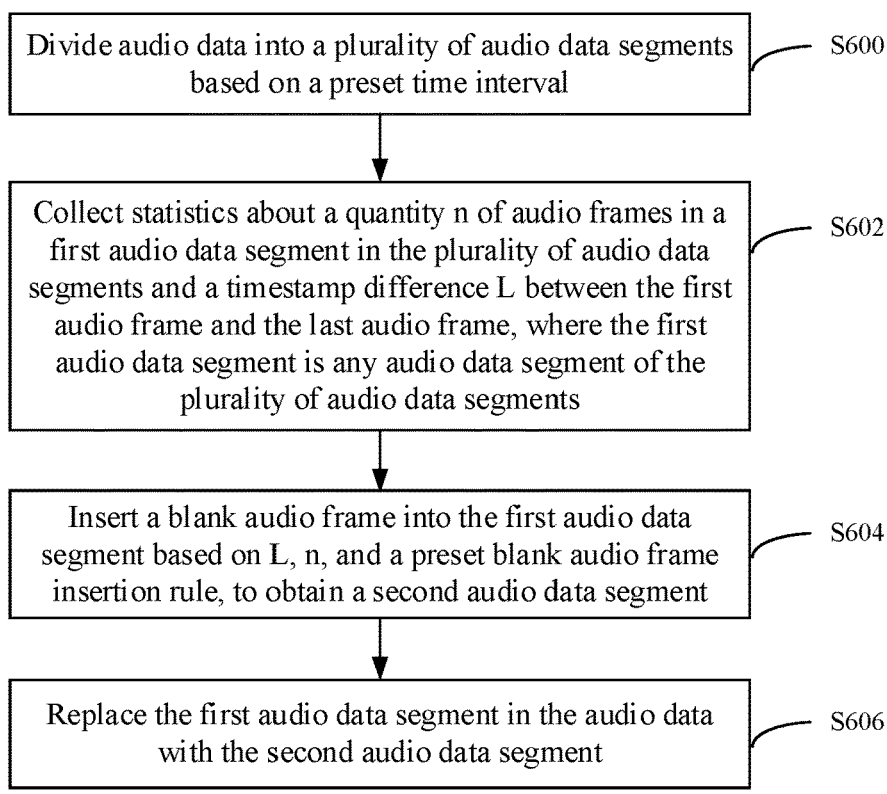
FIG. 6 is a schematic flowchart of a specific embodiment based on FIG. 4.

Referring to FIG. 6, in an example, after the finding the effective video data by using a head node pointer and a tail node pointer of each data node in the doubly linked list, and before the encapsulating, based on an FMP4 format, the effective video data into an MP4Box corresponding to the FMP4-format video data, the computer device 1 further performs the following steps: Step 600. Divide audio data into a plurality of audio data segments based on a preset time interval.

Step 602. Collect statistics about a quantity n of audio frames in a first audio data segment in the plurality of audio data segments and a timestamp difference L between the first audio frame and the last audio frame, where the first audio data segment is any audio data segment of the plurality of audio data segments.

Step 604. Insert a blank audio frame into the first audio data segment based on L, n, and a preset blank audio frame insertion rule, to obtain a second audio data segment.

Step 606. Replace the first audio data segment in the audio data with the second audio data segment.

In this embodiment, each audio frame of the audio data in the effective video data includes one timestamp, and the timestamp is a reference timestamp for synchronously playing audio data and image data in video data. In other words, whether an audio frame in the video data and a video frame in the image data are synchronously played may be checked based on the timestamp. Specifically, the computer device 1 determines whether an audio frame timestamp value between audio frames is greater than an expected value, to determine whether an audio frame is lost or an amount of audio data is reduced in a decapsulation or encapsulation process. If such a case occurs, in a video playback process, the audio data and the image data are very likely asynchronous. Therefore, a blank audio frame needs to be inserted to prevent the audio data and the image data from being asynchronous. In conventional FlvJS, a timestamp difference only between two audio frames is determined to determine whether to insert a blank audio frame. As a result, blank audio frame insertion cannot be correctly processed in some cases. In this embodiment, the computer device 1 calculates a total sum of timestamp differences between audio frames in an audio data segment in a preset time interval, namely, a timestamp difference between the first audio frame and the last audio frame, and compares the difference with a preset threshold, to determine whether a blank audio frame needs to be inserted. In this manner, when a timestamp difference between two audio frames is excessively large but is normal due to averaging in a period of time, the computer device 1 can be prevented from incorrectly inserting a blank audio frame. In addition, when the timestamp difference is excessively large due to accumulation in a period of time, a blank audio frame may also be correctly inserted, to avoid most cases in which the audio data and the image data are asynchronous.

Step S206. Load, through media source extensions, the FMP4-format video data to a Web-end video player for playback.

After encapsulating the effective video data into the FMP4-format video data, the computer device 1 may load, through media source extensions, the FMP4-format video data to the Web-end video player for playback. Media source extensions (MSE) is a W3C specification that allows JavaScript to send bitstreams to a codec in a Web browser that supports HTML5 video. Therefore, compatibility is good.

Figure 7:
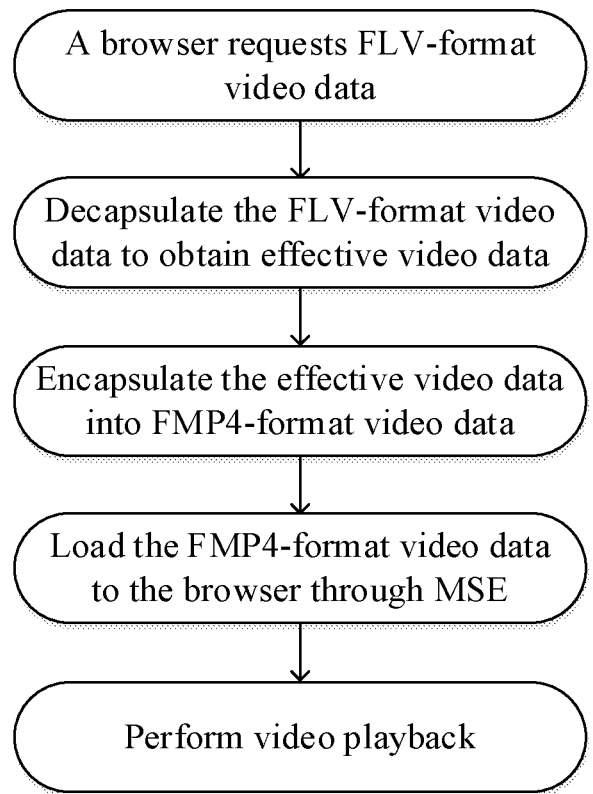
FIG. 7 is a flowchart of a specific embodiment according to this application.

FIG. 7 is a flowchart of an example according to this application.

In this embodiment, the flowchart includes the following process: A browser (namely, a Web end) requests FLV-format video data; decapsulates the FLV-format video data to obtain effective video data; encapsulates the effective video data into FMP4-format video data; and loads the FMP4-format video data to the browser through MSE (namely, media source extensions); and performs video playback.

In conclusion, in the Web-end video playback method provided in this embodiment, the to-be-played FLV-format video data can be obtained; next, the FLV-format video data can be decapsulated by using the preset WebAssembly bytecode, to obtain the effective video data, and the effective video data can be stored into the preset doubly linked list; subsequently, the effective video data in the doubly linked list can be encapsulated by using the WebAssembly bytecode, to obtain the FMP4-format video data; and the FMP4-format video data can be loaded, through media source extensions, to the Web-end video player for playback. Different video data is decapsulated and encapsulated by using the WebAssembly bytecode, and then new-format video data is loaded through media source extensions. This reduces occupation of processing resources in a Web-end video data processing process, and improves processing efficiency.

Embodiment 2

Figure 8:
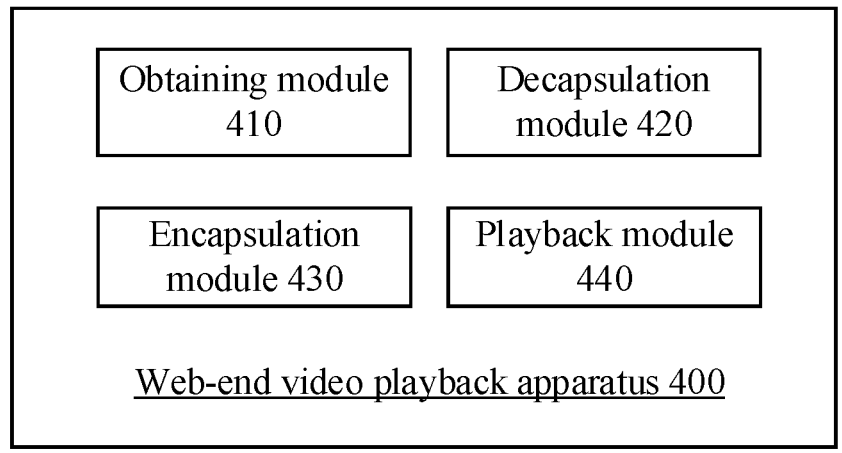
FIG. 8 is a schematic diagram of a program module of an embodiment of a Web-end video playback apparatus according to this application.

FIG. 8 is a schematic block diagram of a Web-end video playback apparatus according to Embodiment 2 of this application. The Web-end video playback apparatus may be divided into one or more program modules. The one or more program modules are stored in a storage medium, and are executed by one or more processors, to complete this embodiment of this application. The program module in this embodiment of this application is a series of computer readable instruction segments that can be used to complete a specified function. The following describes a function of each program module in this embodiment.

As shown in FIG. 8, a Web-end video playback apparatus 400 may include an obtaining module 410, a decapsulation module 420, an encapsulation module 430, and a playback module 440.

The obtaining module 410 is configured to obtain to-be-played FLV-format video data.

The decapsulation module 420 is configured to: decapsulate the FLV-format video data by using a preset WebAssembly bytecode, to obtain effective video data, and store the effective video data into a preset doubly linked list.

The encapsulation module 430 is configured to encapsulate the effective video data in the doubly linked list by using the WebAssembly bytecode, to obtain FMP4-format video data.

The playback module 440 is configured to load, through media source extensions, the FMP4-format video data to a Web-end video player for playback.

In an example embodiment, the WebAssembly bytecode is generated by compiling C language code by using an Emscripten tool, and the C language code includes instruction code used to decapsulate the FLV-format video data and encapsulate the effective video data into the FMP4-format video data at the Web end.

In an example embodiment, the decapsulation module 420 is further configured to: identify, based on an FLV format, an FLV tag in a data encapsulation packet corresponding to the FLV-format video data; and extract the effective video data corresponding to the FLV-format video data from the FLV tag.

In an example embodiment, the encapsulation module 430 is further configured to: find the effective video data by using a head node pointer and a tail node pointer of each data node in the doubly linked list; and encapsulate, based on an FMP4 format, the effective video data into an MP4Box corresponding to the FMP4-format video data.

In an example embodiment, the encapsulation module 430 is further configured to: split and encapsulate the effective video data into a plurality of boxes based on a preset box size in the FMP4 format; and arrange all the boxes based on a sequence, and splice all the boxes based on the arrangement sequence, to form the MP4Box corresponding to the FMP4-format video data.

In an example embodiment, the encapsulation module 430 is further configured to: obtain each audio frame of audio data in the effective video data and a corresponding timestamp, where the timestamp is a reference timestamp for synchronously playing audio data and image data in video data; divide the audio data into a plurality of audio data segments based on a preset time interval; collect statistics about a quantity n of audio frames in a first audio data segment in the plurality of audio data segments and a timestamp difference L between the first audio frame and the last audio frame, where the first audio data segment is any audio data segment of the plurality of audio data segments; insert a blank audio frame into the first audio data segment based on L, n, and a preset blank audio frame insertion rule, to obtain a second audio data segment; and replace the first audio data segment in the audio data with the second audio data segment. The blank audio frame insertion rule includes: when L is less than a preset threshold M, skipping inserting a blank audio frame into the first audio data segment; or when L is greater than or equal to M, inserting a number N of blank audio frames into the first audio data segment based on $N=(L-n*x)/x$, where x is an audio inter-frame spacing, and $M>(n+1)*x$.

Embodiment 3

Figure 9:
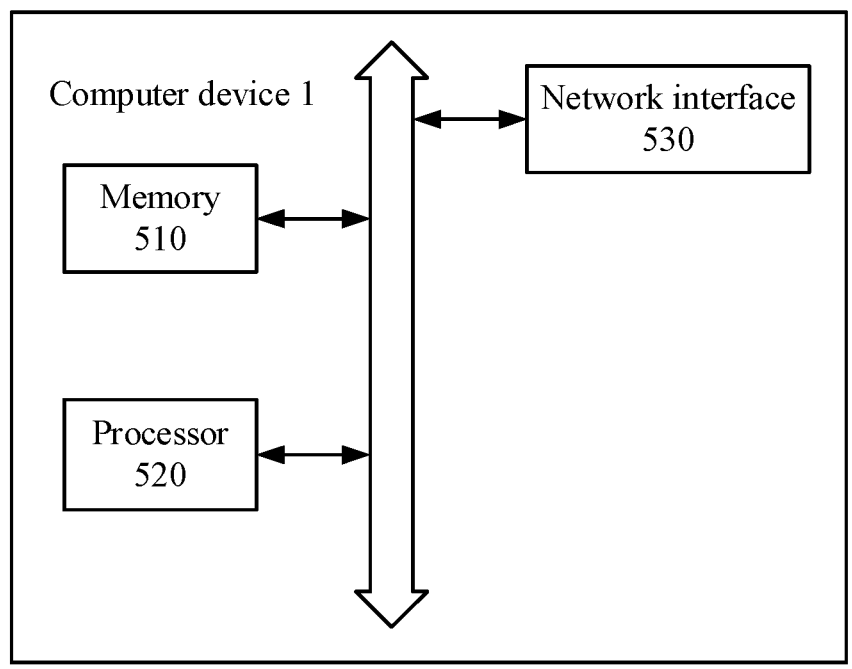
FIG. 9 is a schematic diagram of an optional hardware architecture of a computer device according to this application.

FIG. 9 is a schematic diagram of a hardware architecture of a computer device 1 suitable for implementing a Web-end video playback method according to Embodiment 3 of this application. In this embodiment, the computer device 1 is a device that can automatically calculate a value and/or process information based on an instruction that is set or stored in advance. For example, the computer device 1 may be a rack server, a blade server, a tower server, or a cabinet server (including an independent server, or a server cluster including a plurality of servers) that has a gateway function. As shown in FIG. 9, the computer device 1 at least includes but is not limited to: a memory 510, a processor 520, and a network interface 530 that can be communicatively connected to each other by using a system bus.

The memory 510 includes at least one type of computer-readable storage medium. The readable storage medium includes a flash memory, a hard disk, a multimedia card, a card-type storage (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 510 may be an internal storage module of the computer device 1, such as a hard disk or a memory of the computer device 1. In some other embodiments, the memory 510 may be an external storage device of the computer device 1, for example, a removable hard disk, a smart media card (SMC), a secure digital (SD) card, or a flash card that is disposed on the computer device 1. Certainly, the memory 510 may include both an internal storage module of the computer device 1 and an external storage device of the computer device 1. In this embodiment, the memory 510 is generally configured to store an operating system and various application software that are installed on the computer device 1, for example, program code of the Web-end video playback method. In addition, the memory 510 may be further configured to temporarily store various types of data that has been output or is to be output.

The processor 520 may be a central processing unit (CPU), a controller, a microcontroller, a microprocessor, or another data processing chip in some embodiments. The processor 520 is generally configured to control an overall operation of the computer device 1, for example, perform control and processing related to data exchange or communication performed by the computer device 1. In this embodiment, the processor 520 is configured to run program code stored in the memory 510 or process data.

The network interface 530 may include a wireless network interface or a wired network interface, and the network interface 530 is generally configured to establish a communication link between the computer device 1 and another computer device. For example, the network interface 530 is configured to: connect the computer device 1 to an external terminal by using a network, and establish a data transmission channel, a communication link, and the like between the computer device 1 and the external terminal. The network may be a wireless or wired network such as an Intranet, the Internet, a global system for mobile communications (GSM), a wideband code division multiple access (WCDMA), a 4G network, a 5G network, Bluetooth, or Wi-Fi.

It should be noted that FIG. 9 shows only a computer device with the components 510 to 530. However, it should be understood that implementation of all the shown components is not required, and more or fewer components may be alternatively implemented.

In this embodiment, program code of the Web-end video playback method stored in the memory 510 may be further divided into one or more program modules and performed by one or more processors (the processor 520 in this embodiment), so as to complete this embodiment of this application.

Embodiment 4

This embodiment further provides a computer-readable storage medium. The computer-readable storage medium stores computer readable instructions. The computer readable instructions are executed by a processor to implement the following steps:

obtaining to-be-played FLV-format video data; decapsulating the FLV-format video data by using a preset WebAssembly bytecode, to obtain effective video data, and storing the effective video data into a preset doubly linked list; encapsulating the effective video data in the doubly linked list by using the WebAssembly bytecode, to obtain FMP4-format video data; and loading, through media source extensions, the FMP4-format video data to a Web-end video player for playback.

In this embodiment, the computer-readable storage medium includes at least one type of computer-readable storage medium. The readable storage medium includes a flash memory, a hard disk, a multimedia card, a card-type storage (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of a computer device, such as a hard disk or a memory of the computer device. In some other embodiments, the computer-readable storage medium may be an external storage device of the computer device, for example, a removable hard disk, a smart media card (SMC), a secure digital (SD) card, or a flash card that is disposed on the computer device. Certainly, the computer-readable storage medium may include both an internal storage unit of the computer device and an external storage device of the computer device. In this embodiment, the computer-readable storage medium is generally configured to store an operating system and various application software that are installed on the computer device, for example, program code of a component management method for a service platform in the embodiments. In addition, the computer-readable storage medium may be further configured to temporarily store various types of data that has been output or is to be output.

Clearly, a person skilled in the art should understand that the foregoing modules or steps in the embodiments of this application may be implemented by using a general computing apparatus. The modules or steps may be integrated into a single computing apparatus or distributed in a network including a plurality of computing apparatuses. Optionally, the modules or steps may be implemented by using program code that can be executed by the computing apparatus. Therefore, the modules or steps may be stored in a storage apparatus for execution by the computing apparatus. In addition, in some cases, the shown or described steps may be performed in a sequence different from the sequence herein. Alternatively, the modules or steps may be separately made into integrated circuit modules. Alternatively, a plurality of modules or steps in the modules or steps are made into a single integrated circuit module for implementation. In this way, a combination of any specific hardware and software is not limited in the embodiments of this application.

The foregoing descriptions are merely preferred embodiments in the embodiments of this application, and are not intended to limit the scope of the embodiments of this application. Any equivalent structure or equivalent process change made by using the content of the specification and the accompanying drawings of the embodiments of this application, or when directly or indirectly applied to other related technical fields shall fall within the protection scope of the embodiments of this application.

What is claimed is:

1. A Web-end video playback method, comprising:
receiving on a Web-end computing device FLV-format video data to be played on the Web-end computing device;
decapsulating the FLV-format video data on the Web-end computing device by separating video data from format information in the FLV-format video data using a preset WebAssembly bytecode to obtain effective video data, the effective video data comprising audio data and image data not including packet headers;
storing on the Web-end computing device the effective video data into a preset doubly linked list;
encapsulating the effective video data in the preset doubly linked list using the preset WebAssembly bytecode to obtain FMP4-format video data; and
loading, through media source extensions, the FMP4-format video data to a Web-end video player for playback on the Web-end computing device for viewing by a user of the Web-end computing device.

2. The Web-end video playback method according to claim 1, wherein the preset WebAssembly bytecode is generated by compiling C language code using an Emscripten tool, and wherein the C language code comprises instruction code configured to decapsulate, at a Web end, the FLV-format video data and encapsulate, at the Web end, the effective video data into the FMP4-format video data.

3. The Web-end video playback method according to claim 1, wherein the decapsulating the FLV-format video data using a preset WebAssembly bytecode to obtain effective video data further comprises:
identifying, based on an FLV format, an FLV tag in a data encapsulation packet corresponding to the FLV-format video data; and
extracting the effective video data corresponding to the FLV-format video data from the FLV tag.

4. The Web-end video playback method according to claim 1, wherein the encapsulating the effective video data in the preset doubly linked list using the preset WebAssembly bytecode to obtain FMP4-format video data further comprises:
identifying the effective video data using a head node pointer and a tail node pointer of each data node in the preset doubly linked list; and
encapsulating, based on an FMP4 format, the effective video data into an MP4Box corresponding to the FMP4-format video data.

5. The Web-end video playback method according to claim 4, wherein the encapsulating, based on an FMP4 format, the effective video data into an MP4Box corresponding to the FMP4-format video data further comprises:
splitting and encapsulating the effective video data into a plurality of boxes based on a preset box size in the FMP4 format; and arranging the plurality of boxes in a sequence, and splicing the plurality of boxes based on the arrangement sequence to form the MP4Box corresponding to the FMP4-format video data.

6. The Web-end video playback method according to claim 4, wherein after the identifying the effective video data using a head node pointer and a tail node pointer of each data node in the preset doubly linked list, the Web-end video playback method further comprises:
obtaining each audio frame of audio data in the effective video data and a corresponding timestamp, wherein the corresponding timestamp is a reference timestamp for synchronously playing audio data and image data in video data;
dividing the audio data in the effective video data into a plurality of audio data segments based on a preset time interval;
determining a quantity n of audio frames in a first audio data segment in the plurality of audio data segments and a timestamp difference L between a first audio frame and a last audio frame in the first audio data segment, wherein the first audio data segment is any audio data segment among the plurality of audio data segments;
generating a second audio data segment by inserting at least one blank audio frame into the first audio data segment based on L, n, and a preset rule of blank audio frame insertion; and
replacing the first audio data segment with the second audio data segment.

7. The Web-end video playback method according to claim 6, wherein the preset rule of blank audio frame insertion comprises:
in response to determining that L is less than a preset threshold M, skipping insertion of the at least one blank audio frame into the first audio data segment; and
in response to determining that L is greater than or equal to the preset threshold M, inserting the at least one blank audio frame into the first audio data segment, wherein a number N of the at least one blank audio frame inserted into the first audio data segment is determined based on a formula: $N=(L-n*x)/x$, wherein x represents an audio inter-frame spacing, and $M>(n+1)*x$.

8. A computing device, comprising a memory, a processor, and computer-readable instructions stored in the memory and executable by the processor, wherein the processor executes the computer-readable instructions to implement operations comprising:
receiving FLV-format video data to be played on the computing device;
decapsulating the FLV-format video data by separating video data from format information in the FLV-format video data using a preset WebAssembly bytecode to obtain effective video data, the effective video data comprising audio data and image data not including packet headers;
storing on the computing device the effective video data into a preset doubly linked list;
encapsulating the effective video data in the preset doubly linked list using the preset WebAssembly bytecode to obtain FMP4-format video data; and
loading, through media source extensions, the FMP4-format video data to a Web-end video player for playback on the computing device for viewing by a user of the computing device.

9. The computing device according to claim 8, wherein the decapsulating the FLV-format video data using a preset WebAssembly bytecode to obtain effective video data further comprises:
identifying, based on an FLV format, an FLV tag in a data encapsulation packet corresponding to the FLV-format video data; and
extracting the effective video data corresponding to the FLV-format video data from the FLV tag.

10. The computing device according to claim 8, wherein the encapsulating the effective video data in the preset doubly linked list using the preset WebAssembly bytecode to obtain FMP4-format video data further comprises:
identifying the effective video data using a head node pointer and a tail node pointer of each data node in the preset doubly linked list; and
encapsulating, based on an FMP4 format, the effective video data into an MP4Box corresponding to the FMP4-format video data.

11. The computing device according to claim 10, wherein the encapsulating, based on an FMP4 format, the effective video data into an MP4Box corresponding to the FMP4-format video data further comprises:
splitting and encapsulating the effective video data into a plurality of boxes based on a preset box size in the FMP4 format; and
arranging the plurality of boxes in a sequence, and splicing the plurality of boxes based on the arrangement sequence to form the MP4Box corresponding to the FMP4-format video data.

12. The computing device according to claim 10, wherein after the identifying the effective video data using a head node pointer and a tail node pointer of each data node in the preset doubly linked list, the operations further comprise:
obtaining each audio frame of audio data in the effective video data and a corresponding timestamp, wherein the corresponding timestamp is a reference timestamp for synchronously playing audio data and image data in video data;
dividing the audio data in the effective video data into a plurality of audio data segments based on a preset time interval;
determining a quantity n of audio frames in a first audio data segment in the plurality of audio data segments and a timestamp difference L between a first audio frame and a last audio frame in the first audio data segment, wherein the first audio data segment is any audio data segment among the plurality of audio data segments;
generating a second audio data segment by inserting at least one blank audio frame into the first audio data segment based on L, n, and a preset rule of blank audio frame insertion; and
replacing the first audio data segment with the second audio data segment.

13. The computing device according to claim 12, wherein the preset rule of blank audio frame insertion comprises:
in response to determining that L is less than a preset threshold M, skipping insertion of the at least one blank audio frame into the first audio data segment; and
in response to determining that L is greater than or equal to the preset threshold M, inserting the at least one blank audio frame into the first audio data segment, wherein a number N of the at least one blank audio frame inserted into the first audio data segment is determined based on a formula: $N=(L-n*x)/x$, wherein x represents an audio inter-frame spacing, and $M>(n+1)*x$.

14. A non-transitory computer-readable storage medium, wherein the computer-readable storage medium stores computer readable instructions, and the computer readable instructions are executable by at least one processor on a computing device to cause the computing device to perform operations comprising:

obtaining FLV-format video data to be played on the computing device;

decapsulating the FLV-format video data on the computing device by separating video data from format information in the FLV-format video data using a preset WebAssembly bytecode to obtain effective video data, the effective video data comprising audio data and image data not including packet headers;

storing the effective video data on the computing device into a preset doubly linked list;

encapsulating the effective video data in the preset doubly linked list using the preset WebAssembly bytecode to obtain FMP4-format video data; and loading, through media source extensions, the FMP4-format video data to a Web-end video player for playback on the computing device for viewing by a user of the computing device.

15. The non-transitory computer-readable storage medium according to claim 14, wherein the decapsulating the FLV-format video data using a preset WebAssembly bytecode to obtain effective video data further comprises:

identifying, based on an FLV format, an FLV tag in a data encapsulation packet corresponding to the FLV-format video data; and extracting the effective video data corresponding to the FLV-format video data from the FLV tag.

16. The non-transitory computer-readable storage medium according to claim 14, wherein the encapsulating the effective video data in the preset doubly linked list using the preset WebAssembly bytecode to obtain FMP4-format video data further comprises:

identifying the effective video data using a head node pointer and a tail node pointer of each data node in the preset doubly linked list; and encapsulating, based on an FMP4 format, the effective video data into an MP4Box corresponding to the FMP4-format video data.

17. The non-transitory computer-readable storage medium according to claim 16, wherein the encapsulating, based on an FMP4 format, the effective video data into an MP4Box corresponding to the FMP4-format video data further comprises:

splitting and encapsulating the effective video data into a plurality of boxes based on a preset box size in the FMP4 format; and arranging the plurality of boxes in a sequence, and splicing the plurality of boxes based on the arrangement sequence to form the MP4Box corresponding to the FMP4-format video data.

18. The non-transitory computer-readable storage medium according to claim 16, wherein after the identifying the effective video data using a head node pointer and a tail node pointer of each data node in the preset doubly linked list, the operations further comprise:

obtaining each audio frame of audio data in the effective video data and a corresponding timestamp, wherein the corresponding timestamp is a reference timestamp for synchronously playing audio data and image data in video data;

dividing the audio data in the effective video data into a plurality of audio data segments based on a preset time interval;

determining a quantity n of audio frames in a first audio data segment in the plurality of audio data segments and a timestamp difference L between a first audio frame and a last audio frame in the first audio data segment, wherein the first audio data segment is any audio data segment among the plurality of audio data segments;

generating a second audio data segment by inserting at least one blank audio frame into the first audio data segment based on L, n, and a preset rule of blank audio frame insertion; and replacing the first audio data segment with the second audio data segment.

19. The non-transitory computer-readable storage medium according to claim 18, wherein the preset rule of blank audio frame insertion comprises:

in response to determining that L is less than a preset threshold M, skipping insertion of the at least one blank audio frame into the first audio data segment; and in response to determining that L is greater than or equal to the preset threshold M, inserting the at least one blank audio frame into the first audio data segment, wherein a number N of the at least one blank audio frame inserted into the first audio data segment is determined based on a formula: $N=(L-n*x)/x$, wherein x represents an audio inter-frame spacing, and $M>(n+1)*x$.

* * * * *